United States Patent [19]
Kam et al.

[11] Patent Number: 5,768,631
[45] Date of Patent: Jun. 16, 1998

[54] AUDIO ADAPTER CARD AND METHOD FOR TRAPPING AUDIO COMMAND AND PRODUCING SOUND CORRESPONDING TO THE TRAPPED COMMAND

[75] Inventors: Patrick K. Kam, Pickering, Canada; Robert J. Devins, Essex Junction, Vt.; Stephen Hon, Scarborough, Canada; Emory D. Keller, Jericho, Vt.

[73] Assignee: International Business Machines Corporation, Armonk, N.Y.

[21] Appl. No.: 533,487

[22] Filed: Sep. 25, 1995

[30] Foreign Application Priority Data

Nov. 9, 1994 [CA] Canada ................................. 2135506

[51] Int. Cl.$^6$ .................................................. G06F 13/00
[52] U.S. Cl. .................. 395/892; 395/527; 395/832; 395/882; 364/237.84; 364/284.2
[58] Field of Search ..................... 395/2.1, 310, 800, 395/851, 832, 882, 892, 527; 364/237.84, 284.2

[56] References Cited

U.S. PATENT DOCUMENTS

| | | |
|---|---|---|
| 4,799,150 | 1/1989 | Bui ........................................ 395/310 |
| 5,097,410 | 3/1992 | Hester et al. ........................... 395/851 |
| 5,291,614 | 3/1994 | Baker et al. ............................ 395/800 |
| 5,515,474 | 5/1996 | Deacon et al. ........................... 395/2.1 |

*Primary Examiner*—Thomas C. Lee
*Assistant Examiner*—Ki S. Kim
*Attorney, Agent, or Firm*—Steven B. Phillips; John B. Frisone

[57] ABSTRACT

An audio system is provided for generating audio sound for a host computer. It includes an interface connector for connection with the host computer; an interface controller for communicating with the host computer using the interface connector; a trap adapted to trap audio instruction signals from an application running on the host, such as a game having an audio portion; a trap controller adapted to control the trap; and an audio output. The system operates with an interface communicator which is adapted to respond to a request from the interface controller to read information from the trap and send audio output instruction to the audio output to generate audio sound.

12 Claims, 3 Drawing Sheets

AUDIO ADAPTER CARD AND METHOD FOR TRAPPING AUDIO COMMAND AND PRODUCING SOUND CORRESPONDING TO THE TRAPPED COMMAND

FIELD OF THE INVENTION

This invention is related to audio cards, especially those audio cards which are adapted to synthesize sound for software being played on a computer.

BACKGROUND

A significant number of software programs developed for computers use sound generation to convey information and a sense of excitement for the computer user. This is particularly true for game programs which use both synthesized sound, and in many cases, stored reproduction of actual sounds, such as from musical instruments.

Most computer software games written to date have been written to be compatible with an informal sound generation standard (which corresponds generally to the architecture of Creative Lab's Sound Blaster™ card) which has been adopted by the software games and audio card industries. Effectively, it has become important for the success of new pc computer software games in the marketplace that they be compatible with this sound generation standard. As a consequence of this, audio game card developers have also sought to make their products compatible with this standard so that their products will be able to operate with software written to the standard. Audio cards that are compatible with this standard will be referred to as industry standard audio cards.

There are a number of ways of designing an audio card emulating the function of an industry standard audio card (otherwise referred to as an Industry Compatible Audio Card (ICAC)). Emulation can be done solely in software or by a combination of software and hardware. Software emulation appears to be the preferred route from a point of ease or economy. However, emulation in this way is restricted to software that is not operated under a protected mode in the DOS operating system used by PC computers. Many existing games operate in the DOS protected mode. They will not function properly if used with a pure software emulation of an industry standard audio card. A pure software emulation of an audio card is significantly limited from being fully audio compatible.

The combination of hardware and software of the invention provides a significant improvement over the software-only solution, mentioned above, in providing a solution to operate successfully within software applications in protected or non-protected modes.

There are a number of different PC hardware Bus architectures including the ISA, and EISA Bus standards as well as the PCMCIA interface standard which has been adopted by the computer industry most recently.

This invention is capable of providing good quality sound and supporting software games that are industry standard compatible. It is also capable of application to the above mentioned bus architectures.

SUMMARY OF THE INVENTION

The invention herein provides a system for generating audio sound for a host computer. It includes an audio section (audio circuitry) which includes an interface for communicating with the host computer; a trap adapted to trap audio commands, usually provided by an application program, such as a game, or other sound generating program, running on the computer; and an audio output device, such as an output connection for an amplifier, or preferably a signal processor, such as a digital signal processor. The audio section is adapted to operate with an interface communicator which responds to a request from the interface to read information from the trap and send audio output instructions to the audio output to generate the desired sound output signals. These sound output signals can be fed to speakers, headphones or further amplified as desired.

In the preferred mode of the invention the interface includes an interface connector for operative connection with said host computer to transmit and receive communications therewith, and an interface controller for communicating with the host computer using the interface connector. A controller is provided for the trap to select which audio commands will be trapped by the trap. The controller for the trap (trap controller) is conveniently implemented in the interface controller conveniently with logic circuitry. The audio section is adapted to operate with an interface communicator, which is implemented in software, usually as a Terminate and Stay Resident program (TSR) which runs on the host computer. The interface communicator is adapted to respond to a request from the interface controller to read information from the trap under control of the trap controller and send corresponding audio output instructions to the audio output.

Preferably the trap controller is adapted to control the writing of audio commands to and the reading of audio instruction signals from the trap. The trap controller includes trapping logic adapted to select predetermined audio instruction signals for trapping in the trap. The interface communicator includes a read instruction section or routine which is adapted to read information from the trap by sending read instructions to the trap controller.

The trapping logic of the trap controller preferably includes an input/output command reference table defining the predetermined audio instruction signals which are to be trapped.

In another embodiment of the invention described below the interface communicator includes logic for converting the audio instruction signals to audio output instructions for sending to said audio output. Advantageously, the logic includes a translation table for converting the audio instruction signals to audio output instructions for sending to the audio output.

Advantageously the signal processor is implemented as a digital signal processor which uses a stored or encoded sound generating synthesis algorithm to derive the audio sound output.

Of course when implemented as a computer program, the interface communicator it can be provided to the host computer on a suitable medium, such as a diskette, and transferred to the host computer, for instance, onto the hard drive of such computer, as would be well known, for operation by the computer for sound generation with the audio system of the invention.

In the preferred mode of the invention the audio section comprises a PCMCIA audio adapter module (for instance a card) which is adapted for connection with the system bus of the host computer by means of the interface connector. The interface connector in this implementation consists of the PCMCIA input/output connector which is adapted to connect to the host via the host's corresponding PCMCIA interface coupler or socket and is thereby connected to the host's data processing bus, as will be well appreciated by those skilled in the computer art.

In another preferred embodiment in which the interface communicator is implemented as a program and the signal processor includes a sound mixer register a mixer shadow buffer is included in the audio section.

In yet another variation of the invention herein the interface communicator program includes a routine adapted to respond to an interrupt request from the interface controller to read information from the trap and send instructions to produce audio output from the audio output.

One implementation of the invention provides an interface communicator program for operating on a host computer having an audio section with a trap adapted to trap audio instruction signals. The interface communicator includes a routine adapted to respond to a request from the audio section to read information from the trap and send audio output instructions to an audio output of the computer to produce audio sound. The routine advantageously includes logic and stored translation data.

In another implementation of the invention, where the audio output of the computer includes a signal processor,the routine reads information from the trap and derives corresponding audio output instructions for transmission to the signal processor to execute a corresponding audio sound generation function.

Instead of being provided as a separate module or card for insertion into a host computer the audio section of the invention can be incorporated into the computer itself, preferably on the main or motherboard thereof to form a complete audio producing computer capable of running audio producing application programs. This would be particularly advantageous for laptop or notebook sized computers in which it may be advantageous to limit the number of external connections

DESCRIPTION OF A PREFERRED EMBODIMENT OF THE INVENTION

Figure 1:
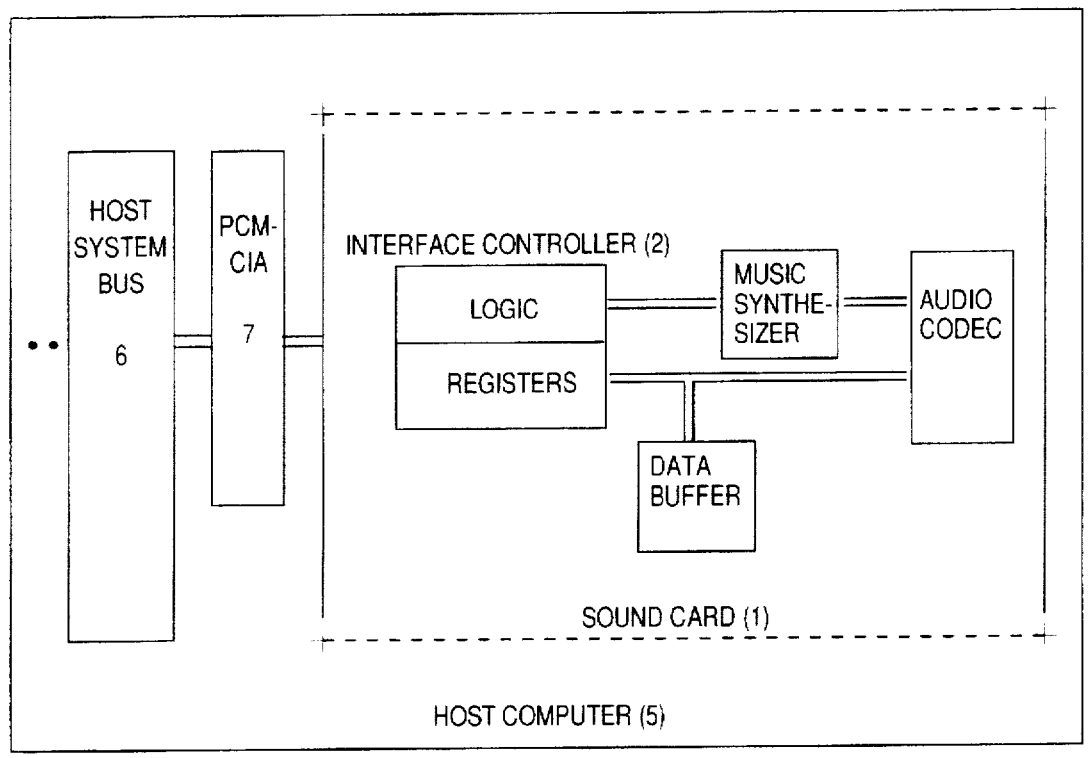
FIG. 1 depicts a block diagram of an industry standard audio card.

Referring to FIG. 1 which depicts an audio card 1 generally conforming to industry standards, when a software application (eg. a game) that is compatible with industry standard is running on the host computer 5, it communicates to the sound system or audio card 1 used by that computer through register addresses defined by the industry standard specifications for that type of audio card. This results in generation of sounds and or music by the audio system.

The registers 8 of the audio card 1 are read from or written to by program input/output commands (PIO). The registers 8 are used to provide registers for a number of audio card requirements as will be indicated by the common numbering (8) of these registers.

Figure 2:
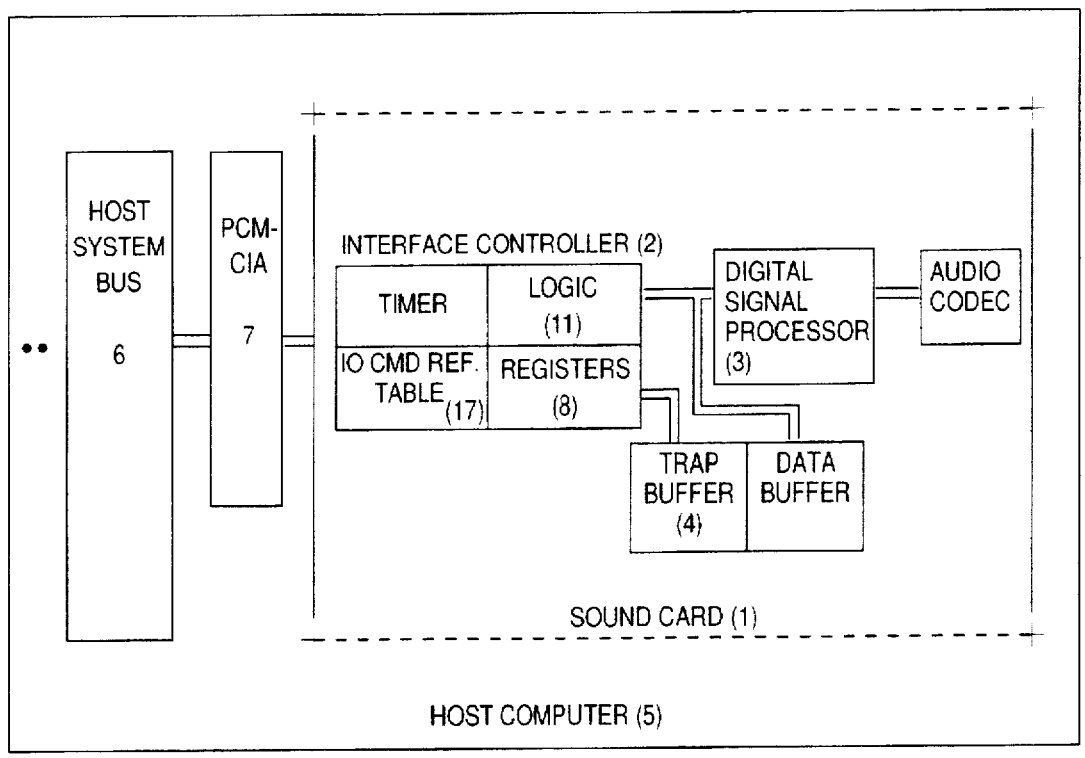
FIG. 2 depicts a block diagram of an audio card according to the present invention.

Referring to FIG. 2, one implementation of the invention audio card 1 circuitry hardware includes an interface controller 2, which may be implemented as an ASIC for interfacing with the host 5 system bus 6 (eg. using a PCMCIA interconnection 7) and the internal audio circuitry of the card, a digital signal processor (DSP) 3 which processes the signals it receives and in this implementation also generates sound signals using a sound generating synthesis algorithm; a DRAM data I/O trap 4 (trap 4 could be configured as a FIFO buffer) for trapping input/output commands received and selected by I/O trapping logic 11 of the interface controller; and a Terminate and Stay Resident (TSR) program, the operation of which is initiated by an interrupt request from the interface controller, for operation by the host system to read information in the trap and take appropriate action such as sound generation, volume control, .and the like.

When an application program (such as a game) running on the host 5 requires sound generation, it sends an I/O request to the audio card 1, which in the case of a I/O request to a specific selected industry compatible series of addresses will be trapped in the trap 4 for later use in sound generation by the audio system.

In the present implementation the controller 2 will cause these program input/output commands as well as data transmitted to be stored in I/O trap 4 which is implemented as a buffer or cache.

In this implementation the trap buffer is organized as 16 bit data storage. References to addresses, address bits, and bit positions which follow are made in accordance with PC computing practices and are well known to those skilled in the art of PC or ISA computers. Bit 15 indicates whether the trap is an I/O Write (1) or I/O Read (0) function. Bits 14 to Bit 8 indicate the I/O address of the trap. As the total trapped I/O address is more than 7 bits wide, only address bits SA9–SA7 and SA3–SA0 are recorded as address bits SA6–SA4 are not critical in this implementation. The contents of data Bit 7 to data bit 0 indicate the data of the I/O trap 4. For an I/O write trap the data is the data written. For an I/O read trap the data has no meaning and is ignored. To avoid overflow of the trap buffer, in the present implementation we have chosen a 4 k deep trap buffer however those skilled in the art will appreciate that this can be adapted as required.

Table 1 below "Standard Audio Card I/O Functions" is a representation of industry compatible audio card functions and the address range of the particular implementation herein (of the I/O trap 4). The addresses listed represent the addresses used by the standard sound card functions. The table indicates whether the function comprises a read or write command and whether an interrupt (IRQ) will be generated by the particular I/O command. The contents of the last column "Register Characteristics" is explained in the description which follows.

TABLE 1

STANDARD AUDIO CARD I/O FUNCTIONS

| Address | Function | Command | IRQ | Register Characteristic |
|---|---|---|---|---|
| 2X0, 2X2 | Alternate Synthesizer Register Port | Write | N | Group 1 |
| 2X1, 2X3 | Alternate Synthesizer Data Port | Write | Y | Group 1 |
| 2X4 | Mixer Register Port | Write | N | Group 2 |
| 2X5 | Mixer Data Port | RD/WR | Y | Group 2 |
| 2X6 | ICAC Reset Toggle | Write | N/Y | Group 4 |
| 2X8 | Synthesizer Status Port A | Read | N | Group 3 |
| 2X8 | Synthesizer Register Port A | Write | N | Group 3 |
| 2X9 | Synthesizer Data Port A | Write | Y | Group 3 |
| 2XA | ICAC Read Data Port | Read | N | Group 4 |
| 2XC | ICAC Data or Command | Write | Y | Group 4 |

TABLE 1-continued

STANDARD AUDIO CARD I/O FUNCTIONS

| Address | Function | Command | IRQ | Register Characteristic |
|---|---|---|---|---|
| 2XC | ICAC Write Buff Status | Read | N | Group 4 |
| 2XE | ICAC Data Avail Status | Read | N | Group 4 |
| 388 | Synthesizer Status Port B | Read | N | Group 5 |
| 388 | Synthesizer Register Port B | Write | N | Group 5 |
| 389 | Synthesizer Data Port B | Write | Y | Group 5 |

Group 1 Functions

Group 1 functions are dedicated to alternate synthesizer sound generation which has been referred to in the industry as C/MS sound generation. Alternate synthesis sound generation is an alternative to FM synthesis sound generation. Referring to Table 1, the four registers involved (2x0, 2x2, 2X1, 2X3) in C/MS sound generation are write only. Addresses 2X0, and 2X2 are used for the alternate synthesizer (C/MS) register port. Addresses 2X1, and 2X3 are used for the alternate synthesizer (C/MS) data port. When the host application program writes to the alternate synthesizer (C/MS) register port both the I/O address and the data (in bytes) will be stored in the trap buffer 4. The data of the I/O write to the C/MS register port will be converted to the internal register address of the alternate synthesizer. This establishes the location in the synthesizer internal registers where the data of the I/O write to the data port will be stored. In the case of the implementation of sound card 1 depicted in FIG. 2 the Digital Signal Processor (DSP) 3 can be used to emulate a C/MS synthesizer. When the trapping logic 11 generates an interrupt after the I/O write to the alternate synthesizer registers the TSR will be invoked and perform the appropriate task on the Digital Signal Processor 3 (DSP) to emulate the function.

Group 2 Functions

Group 2 functions implement mixer registers of an industry compatible audio card. The mixer registers are used primarily for storing volume control and balance information. The control of the mixer registers is performed by indirect addressing. Writing data to the mixer register must include writing to the register port PIO (2X4) followed by writing to the data port(2X5). The data of the I/O write to the register port is converted into the mixer entry location for the data of the I/O write to the dataport to be written to. In the current implementation of the invention, the mixer function is emulated by the DSP.

When an application accesses the mixer register to change its settings, all the I/O writes to the register port and data port are trapped by the trapping logic. The trapping logic interrupts the host to activate the TSR which will interpret the function called by the host application and pass appropriate parameters to the Digital Signal Processor 3 (DSP) which controls the mixer of the audio card. This ensures compatibility with the industry standard audio card without actually having the same hardware on the card.

The present implementation of the invention also provides mixer register shadowing. Mixer registers 8 contain audio control parameters such as volume or balance. Unlike other registers which require timeout for a number of microseconds before they can be read after they are written to, mixer registers can be written to and read back immediately. Some (or a number of) games are capable of writing to the mixer registers directly and reading them back immediately. This provides no time for the TSR program to read the trap buffer 4 and perform any necessary analysis. The provision of mixer register shadowing provides a set of mixer registers 8 that can be written to or read from by the game directly while the TSR is provided with sufficient time to fetch data from the trap buffer 4 and perform analysis, to determine what action to take.

As the host application may read the mixer registers immediately after writing to it to query the data, the interrupt generated by the trapping logic may not be serviced by the TSR and the actual parameters may not have been passed on to the DSP 3 which controls the actual mixer function. In order to ensure compatibility, the current implementation has a mixer shadow buffer (not shown) implemented in hardware which keeps track of the latest parameters written to the mixer register. Whenever the host reads the mixer registers, the parameters from the mixer shadow buffer are passed on to the host regardless of whether the function corresponding to the parameters has been actually implemented. The mixer registers are illustrated in Table 2, in which the heading "Mixer Reg." refers to the address of mixer registers, and the headings "D0–D7" refer to data bits 0 to 7 respectively.

TABLE 2

Mixer Registers

| Mixer Reg. | D7 | D6 | D5 | D4 | D3 | D2 | D1 | D0 |
|---|---|---|---|---|---|---|---|---|
| 04 | Voice Volume Left | | | | Voice Volume Right | | | |
| 0A | X | X | X | X | X | MIC Mixing | | |
| 0C | X | X | In Filter | | | ADC | | X |
| 0E | X | X | DNFI | X | X | X | VSTC | X |
| 22 | Master Volume Left | | | | Master Volume Right | | | |
| 26 | FM Volume Left | | | | FM Volume Right | | | |
| 28 | CD Volume Left | | | | CD Volume Right | | | |
| 2E | Line Volume Left | | | | Line Volume Right | | | |

Group 3 and 5 Functions (Synthesizer Registers 2X8, 2X9, 388, 389) Group 3 and 5 are functions for the Synthesizer which produces synthetic music in an industry compatible audio card. The register and data ports of the synthesizer are write only. They hold parameters required by the synthesizer to generate the requested music. Accessing the synthesizer register comprises first writing to the register port (2X8 or 388) followed by writing to the corresponding data port (2X9 and 389). In a normal music generation sequence, multiple writes to the synthesizer register are required. Often, the host 5 will write all the parameters to the synthesizer register essentially at once. The I/O trap logic 4 traps each of the I/O Write access to the synthesizer registers. After each I/O write to the register port or data port, an interrupt is generated. As the host 5 may not allow the service of each interrupt by the TSR during a sequence of writes, the trap buffer 4 needs to be big enough to hold all the trapped data for best performance. When the TSR finally is invoked after the application finishes writing a sequence of I/O commands to the synthesizer registers and the interrupt is serviced, the TSR will be able to read all the trapped information and executes tasks on the DSP to emulate the music generation sequence.

As two timers are available in Industry compatible Audio Cards (ICAC), the logic in the I/O Trapping mechanism emulates the function by providing registers that act the same as the timer in Industry Compatible Audio Cards. When the TSR detects the trap of a timer function (I/O Write to the Timer register in the synthesizer register), it loads the internal timer register 8 of the audio card and starts the timer. When the timer expires, a timer interrupt occurs. When the TSR services the interrupt and detects the expiration of timer, it updates the Timer Status Register 8 to indicate the expiration. This successfully emulates the timer of the Industry Compatible Audio Cards.

Game Control

A game program will typically operate timers in the following steps:

1. '2X8'H PIO Write . . . points to Timer 1 or 2
2. '2X9'H PIO Write . . . load timer value
3. '2X8'H PIO Write . . . points to Timer Control Register 8
4. '2X9'H PIO Write . . . starts timer counting
5. '2X8'H PIO Read . . . check for timer expired, loop on this step until timer interrupt status is '2'
6. '2X9'H PIO Write . . . reset timer interrupt status Group 4 (Industry Compatible Audio Card ICAC) Functions The Reset Toggle Register 8 (2X6) is used to execute a Industry Compatible Audio Card (ICAC) reset. The result of a successful reset sequence is used by software applications to verify the existence of the sound card. When the application executes the I/O Write command to begin a reset sequence, the I/O command is trapped by the trapping logic. An interrupt is generated to the host to invoke the TSR which detects the interrupt and does an appropriate ICAC reset. It then updates the ICAC Read Data Port (2XA) and also sets the Data Available Status register 8 (2XE). When the application reads the Data is available, it issues an I/O Read to the Read Data Port (2XA), which contains the data, signalling that the reset operation is complete.

After the reset, the Write Buffer Status Register 8 (2XC) indicates that the ICAC card is ready to accept commands or data from the application. Any I/O writes to addresses corresponding to an I/O Trap will be trapped in the Trap Buffer 4. When the TSR is executed to service the interrupt, the Write Buffer Status busy bit is set to indicate the ICAC is busy to stop accepting commands from the application until it has handled all the trapped information, at which time, the Write Buffer Status Register will indicate a ready state.

Reading data from the ICAC sound card is performed in similar fashion. When the TSR detects a request for data from the ICAC by the application, it writes a data byte to the Read Data Port (2XA). It then sets the Data Available Status Register 8 to indicate data is available. When the application reads the data available bit, it reads the data from the Read Data Port (2XA) and the Data Available Status Register 8 is automatically reset.

Figure 3:
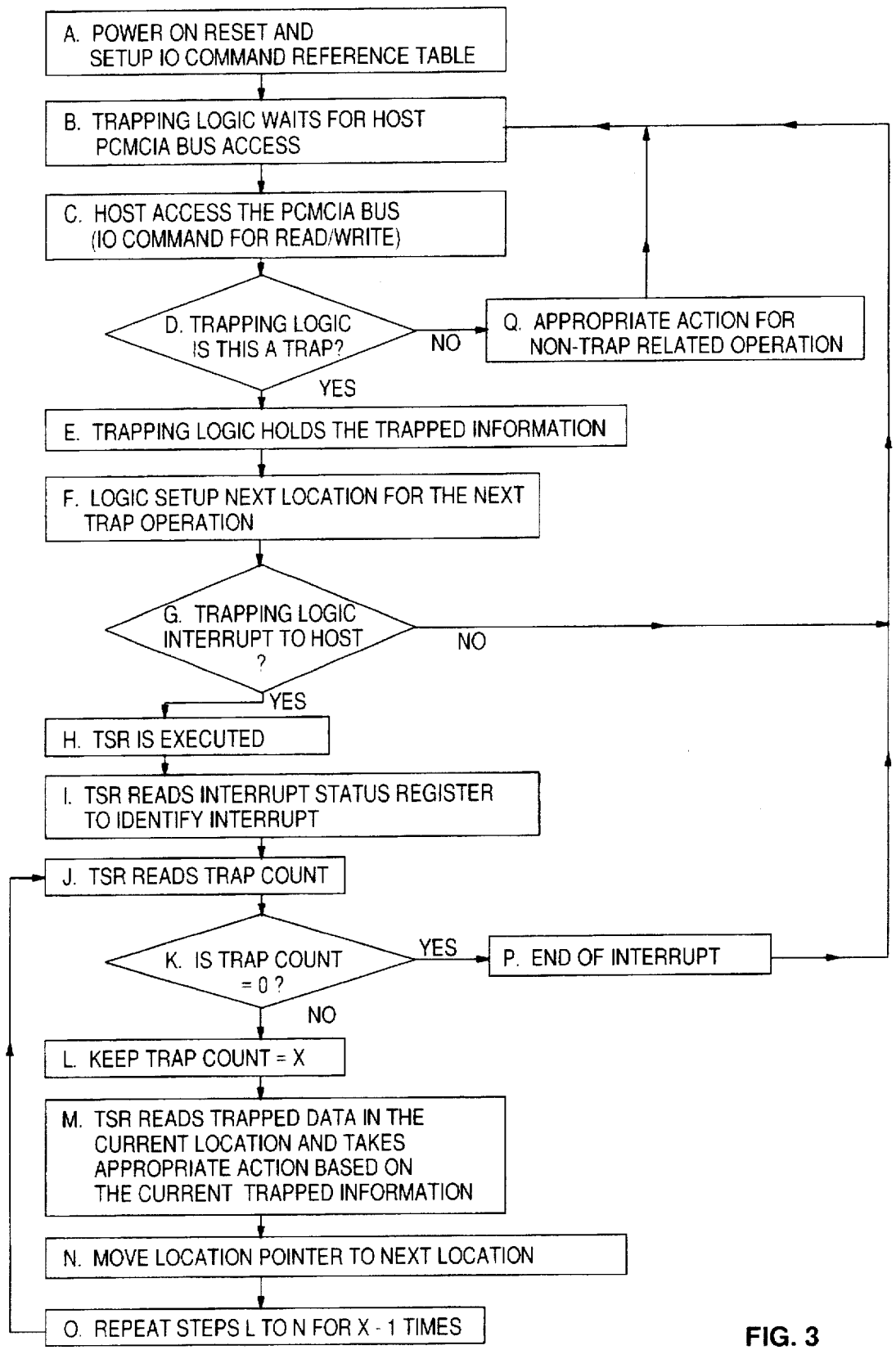
FIG. 3 depicts a flow chart of the TSR program of the invention.

An I/O command reference table 17, the contents of which correspond to selected instructions (such as SoundBlaster synthesizer commands to register addresses 2X8, 2X9, 388, 389, in Table 1 of controller 2) is used by the controller 2 to identify the type of I/O command to be trapped and whether an interrupt should be generated to the host 5 on receipt of a command. Referring to FIG. 3, when an I/O command calling for an audio card function corresponding to the I/O commands listed in Table 1, is identified then the controller 2 will selectively generate an interrupt request as determined by the information in Table 17, on a control line (not shown) to the host 5, which interrupts its processing. The host uses the TSR program to process the interrupt received from the controller. The TSR program analyzes the trapped commands and data contained in the trap buffer 4 and then takes the appropriate actions based on the trapped information to fill the game request, such as initiating sound reproduction by a sound synthesizer contained in the DSP 3 in this implementation, or by the playing of a digitized sample of sound as recorded in the application software.

Referring to the flow chart of FIG. 3, which shows a particular method of the invention, the method can be viewed as a series of interrelated steps as follows:

(Step A) The host system 5 sets up the I/O command reference table 17 in the interface controller after power on reset of the audio card. The table 17 is used to identify the I/O addresses and commands to be trapped and whether an interrupt will be generated by the audio card on a trap occurrence.

(Step B) After the setup process, the trapping logic on the audio card 1 waits for the host 5 to access the PCMCIA BUS.

(Step C) On any host I/O access to the PCMCIA Card, (i.e. either I/O write, or I/O Read), (Step D) the trapping logic will determine whether the access represents a trap based on the information in the I/O Command reference table 17.

(Step Q) If the access is not a trap, other parts of the logic on the accessory card will take appropriate action for the non-trap related operation and the trapping logic 11 returns to the state of waiting for another host PCMCIA Bus I/O access (Step B).

(Step E) If the access represents a trap, the trapping logic 11 will retain the trapped information in its current trap store location, (in this particular case a DRAM), and (Step F) move the location pointer for the trap store location to the next location. If the trap is a timer function, the TSR writes to the timer logic on the audio card to perform the function. If the trap is an audio control or synthesizer function, the TSR directs an appropriate task to the DSP 3 to produce sound. If it is a DMA function, the TSR activates the host "Data Mover" program. (Step G) The trapping logic then decides whether to interrupt the host based on information in the I/O Command reference table. If an interrupt is not required, the trapping logic returns to the state of waiting for another host PCMCIA Bus I/O access (Step B).

(Step H) If an interrupt is required, the trapping logic will interrupt the host and the TSR will be executed.

(Step I) When the TSR is executed, it reads the interrupt status register on the accessory card to identify the source of interrupt. In the case of an I/O Trap, the source of interrupt is indicated as a trap interrupt.

(Step J) In the case of a trap interrupt, the TSR reads the trap count to determine the number of items present in the trap storage. (Step P) If the trap count is zero (no items left in trap storage), the TSR issues an end of interrupt signal to the host and the trap logic returns to the state of waiting for a host PCMCIA Bus I/O access (Step B). (Step L) If the trap count is non-zero, the TSR keeps track of the count (denoted as x). (Step M) The TSR then reads the trapped data in the first location of the trap storage and takes appropriate action based on the current trapped information (see below). (Step N)

The TSR then reads the next location. Steps M and N are repeated for another x-1 times until all the trapped information based on the trap count (x) has been processed (Step O).

As a new I/O trap may occur while the TSR acts on the x number of I/O traps, the TSR will read the trap count again after completion of the x number of traps (Step J). If the new trap count is non-zero, the process is repeated from Step K. If the new trap count is zero, an end of interrupt (Step P) is generated and the trapping logic returns to the wait state for a HOST PCMCIA Bus I/O access (Step B).

The operation of the TSR can be appreciated as follows: if the game or application program requests music, sound effects, specific audio levels or balance or any other audio functions then the TSR will pass the required parameters to effect these functions to the DSP 3 which will initiate performance of the functions. If the game requests the setting up of a timer function such as would be needed if a note or sound effect is to be produced for a length of time, the TSR will instruct the controller 2 to begin the timing operation and at the end of the timing operation the controller 2 will interrupt the host to acknowledge the completion of the timer function. In the implementation depicted the controller 2 has two timers, one a long duration, the other a short duration however any convenient timer arrangement can be used. If the application program or game requests the playing of a wave file or digitized sound sample, a large volume of data will consequently be needed to be moved between the host 5 and the audio card 1. In this case the TSR will be responsible for moving the data from the host storage or memory to the audio card 1.

If because of software compatibility, Direct Memory Access (DMA) is requested to transfer the data the TSR has to emulate this function as in the current PCMCIA designs there is no DMA capability. The emulation of DMA requests is disclosed and claimed in a related patent application.

Some games written for industry compatible audio cards may pose a problem to a system using command trapping. A number of games issue a number of commands in sequence to set up the parameters for the FM synthesizer that is expected to be found in the card instead of issuing one command and then checking for the status of the command before issuing another command as has been recommended for the use of standard compatible audio cards. Because of the large sequence of commands that may be issued, a relatively large data cache or command trap buffer 4 will be required. In the current implementation we have chosen a trap buffer which can store 4 K 16 bit words. Buffers of other sizes can be used as appropriate as will be well known to persons skilled in the art.

Some games that are designed to use industry compatible audio cards use an audio I/O read command for timeout purposes. This is not generally recommended for operation in the compatible audio card systems; however it is done by a number of games none-the-less. If these commands are trapped they will serve no useful purpose in the trap buffer 4 and may result in filling it up, excluding commands that are desired. The invention overcomes this by providing a filter (command reference Table 12) which filters the I/O commands so that only the meaningful commands are trapped. Similarly, unnecessary I/O write commands can be filtered out to save trap buffer space and cut down on unnecessary interrupts.

The following pseudocode listing represents a preferred embodiment of the invention using the TSR and hardware described above and in the drawings.

Initialize Hardware for Trapping

Get Base I/O configuration for compatible audio from user configuration file. Open I/O windows for both the configurable base I/O address and the fixed I/O address for ADLIB (388–389) (a music synthesizer). Initialize the audio card trapping decoder's base address to the Base I/O. (This causes the hardware trap logic 11 to decode and trap I/O accesses in the trap in the specified address range).

Initialize the audio card blocking register to block ALL industry compatible audio I/O reads at this time. This prevents I/O traps that contain no useful information from filling up the trap 4. At a very specific time, a read trap is enabled. This is used to return a multiple-byte version number to the application.

Initialize the audio card blocking register to block specific industry compatible audio I/O writes. This prevents I/O traps of writes that contain no useful information from filling up the trap 4.

Initialize the audio card interrupt mask to allow interrupts on specific I/O writes. Some I/O writes do not cause interrupts.

Initialize the read-data-port image register to 0AAh. This is the value that is to be read from the industry compatible audio read data port when an application initializes and resets.

Initialize for interrupts

Hook the hardware interrupt assigned to the audio card. Issue End-Of-Interrupt (EOI) to the host's 5 interrupt controller to reset and enable the host 5 for interrupts Enable Trapping and Master interrupts on the audio card.

Enter TSR resident mode

Now ready to run an industry compatible audio software application.

Interrupt Processor: (this is used to enter the TSR once resident)
Swap addressability into the TSR:
Setup Data-Segment and Stack-Frame
Disable Master Card interrupts to prevent reentrancy
IF the interrupt is a TRAP interrupt
THEN
  DO UNTIL the count register of trap 4 is zero
  (this outer loop is used to catch trap 4 entries trapped WHILE the TSR is processing commands in the trap 4. This can occur when the application interrupts the TSR on a higher priority and performs more I/O's that are trapped. Note: Because of the depth of the trap 4, no entries are lost when processing is ongoing).

Read AND zero the trap count register
    Set trap read index to the first entry
    WHILE the count is not zero
    (this inner loop is used to process all fifo entries that are stored at the time of the interrupt. Note: Because of the depth of the trap 4, I/O's are not lost due to lot's of I/O traffic while system interrupts are disabled).

Read the indexed entry in the trap 4. This entry contains coded information about the I/O trap; the I/O address, the direction (or type) of the access (read/write), and the data associated with the access.

(dispatch the data trapped to the appropriate part of the TSR to handle the command or data)
        IF the I/O address for the music synthesizer (OPL or ADLIB are the types of synthesizers typically used in the industry)
        THEN
          Send the data to the OPL synthesizer (in the embodiment considered herein)

ENDIF
IF the I/O address for the industry standard command processor (interface controller 2) (ie., adapted to handle commands or industry standard type and format)
THEN
Send the data to the industry standard command processor (interface controller 2)
IF the command is request version number
THEN
Write the first byte of the version number into the read-data-port image register
Enable Read-Trapping of the read-data-port (this allows the TSR to know when the application read the first part of the version number and when it can write the second part of the version)
ENDIF
ENDIF
IF the I/O indicates a industry compatible audio reset
THEN
Reset the TSR's data objects, OPL and command processors (interface controller 2),
and write 0AAh into the read-data-port image register
ENDIF
IF the I/O is a read of the read-data-port
THEN
Write the second byte of the version number into the read-data-port image register
Disable Read-Trapping of the read-data-port
(the version number is completed, no need to see reads of the read-data-port)
ENDIF
Increment the FIFO read index
ENDWHILE the count is not zero
END DO UNTIL the FIFO trap count register is zero
(All traps are processed, exit the interrupt handler):
Clear the Trap interrupt bit in the audio card interrupt status register
Issue End-Of-Interrupt (EOI) to the PC's interrupt controller
Enable the Master Card interrupt
Swap addressability to the application:
Restore the Data-segment and Stack-Frame
Return from Interrupt (IRET)
ENDIF the interrupt is a TRAP interrupt
(Control now returns to the application)
IF the interrupt was not a TRAP interrupt, it could have been another program or hardware interrupt sharing with the card
THEN
Pass control to the next vector in the interrupt chain
ENDIF It will be appreciated that the above description illustrates the manner in which the invention may be made and used and that implementations of other variations of the invention will be apparent to those skilled in the art and that the invention is not limited by the specific embodiments described.

The embodiments of the invention in which an exclusive property or privilege is claimed are defined as follows:

1. An adapter card for generating sound for a host computer which includes an application program requiring the generation of sounds and a communication interface program for generating audio output instructions in response to audio commands comprising:

an audio circuit including;
a host computer interface for connecting the audio circuit to the host computer;
a host interface controller for communicating with the host computer via the host interface;
a trap adapted to trap audio commands received from an application program resident in the host computer;
a trap controller for controlling the trap;
an audio output circuit responsive to audio output instructions for providing output signals suitable for driving sound producing equipment; and
said audio circuit, in response to selected trapped commands, transmitting request signals to the communication interface requesting the communication interface to read information from the trap under control of the host interface controller and to send audio output instructions corresponding to the read trapped information to the audio output circuit.

2. The apparatus of claim 1 in which said trap controller is adapted to control the writing of audio commands to and reading of audio commands from said trap.

3. The apparatus of claim 1 in which said communication interface includes read instruction means adapted to read information from said trap by sending read instructions to said trap controller.

4. The apparatus of claim 1 in which said interface controller includes said trap controller, said trap controller including trapping logic adapted to select predetermined audio commands for trapping in said trap.

5. The apparatus of claim 1 in which said audio output circuitry comprises a signal processor which is adapted to process audio output instruction signals to derive audio sound output.

6. The apparatus of claim 4 in which said trapping logic includes an input/output command reference table defining said predetermined audio commands for trapping.

7. The apparatus of claim 4 in which said communication interface includes logic for converting said audio commands to audio output instructions for sending to said audio output circuitry.

8. The apparatus of claim 4 in which said communication interface includes a translation table for converting said audio commands to audio output instructions for sending to said audio output circuitry.

9. The apparatus of claim 5 in which said signal processor comprises a digital signal processor implementing a sound generating synthesis algorithm to derive said audio sound output.

10. In a computer system including a resident application program requiring the generation of sounds in response to audio commands provided by the application program, a resident communication interface program for generating audio instructions in response to audio commands and an input/output bus for attaching an audio adapter card for generating signals suitable for driving conventional sound generating equipment in response to received audio instructions, a method of operation including the steps:

generating a command reference table in the audio adapter card;
transmitting audio commands generated by the application program directly to the adapter card;
comparing received commands to those in the reference table and storing predetermined included commands in a trap buffer located in the audio card;
interrupting the processor and calling the communication interface program when the trap buffer includes selected predetermined audio commands included in the command reference table;

transferring the selected audio commands to the communication interface program resident in the computer for conversion into audio instructions; and transmitting the audio instructions to the audio adapter for conversion to signals suitable for driving conventional sound generation equipment.

11. The method according to claim 10 further comprising the step of writing to timer logic on the adapter card if the trap is a timer function.

12. The method according to claim 10 further comprising the step of activating a data mover program if the trap is a DMA function.

* * * * *